G. J. HENRY, Jr.
MECHANISM FOR CONTROLLING IMPACT STREAMS.
APPLICATION FILED AUG. 19, 1908.
1,002,517.
Patented Sept. 5, 1911.
4 SHEETS—SHEET 3.
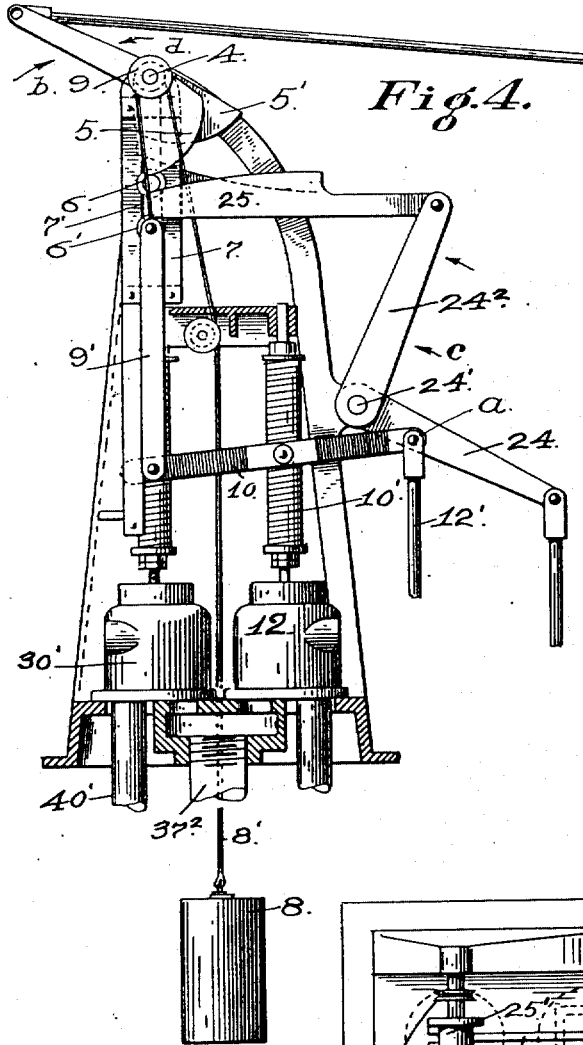
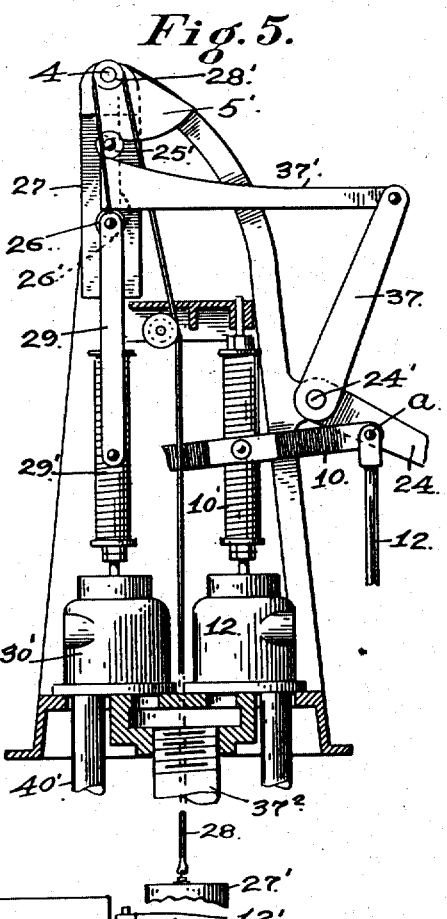
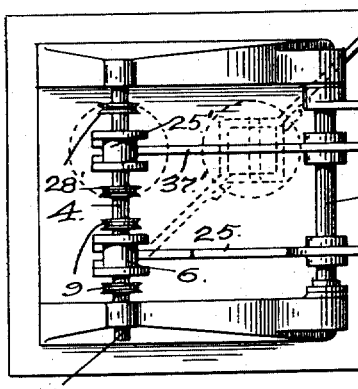
WITNESSES.
Arthur L. Slee.
Wm F. Booth
INVENTOR.
George J. Henry, Jr.
by N. A. Acker
his atty.

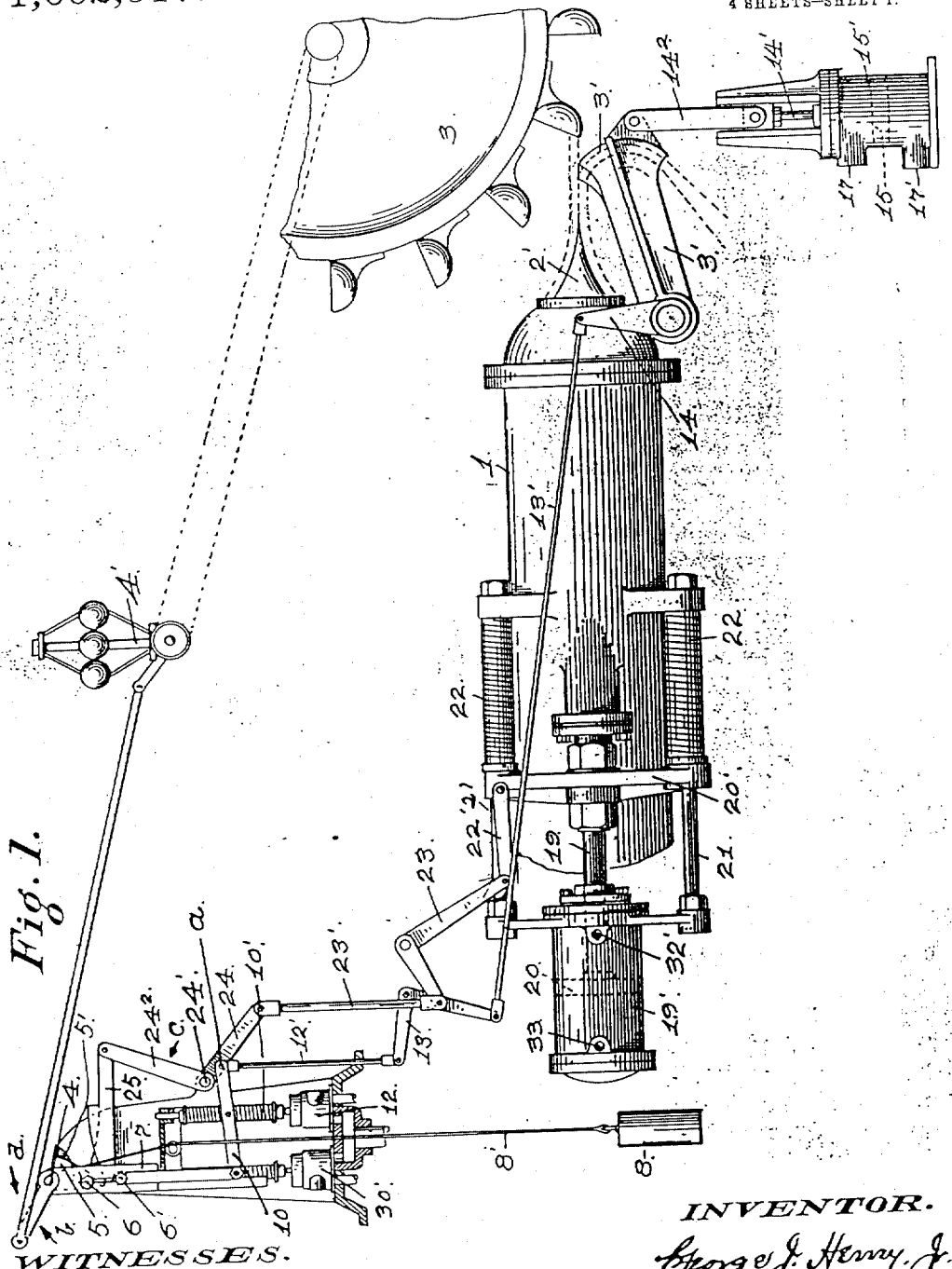

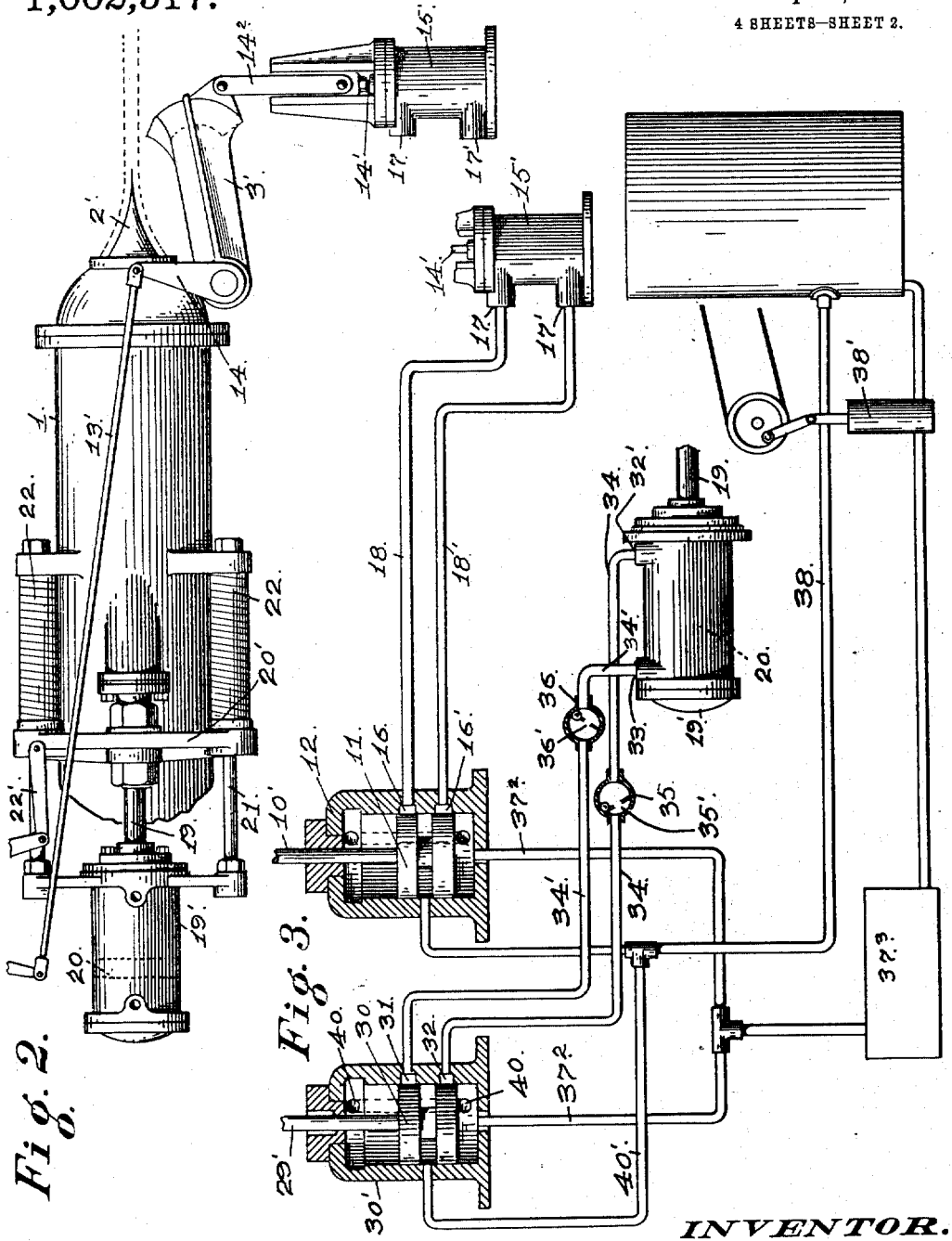

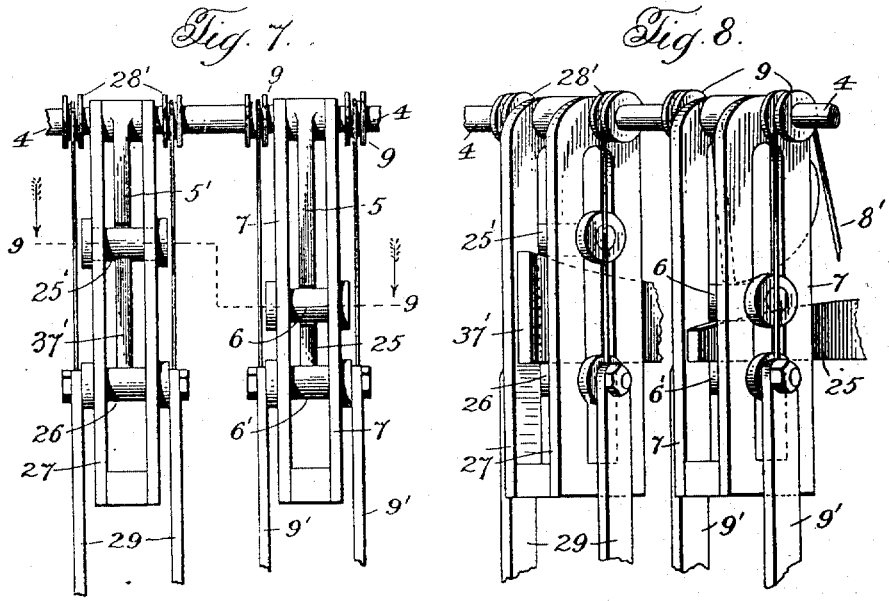
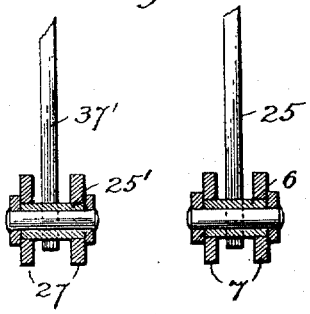

UNITED STATES PATENT OFFICE.

GEORGE J. HENRY, JR., OF SAN FRANCISCO, CALIFORNIA, ASSIGNOR OF ONE-HALF TO THE PELTON WATER WHEEL COMPANY, OF SAN FRANCISCO, CALIFORNIA, A CORPORATION OF CALIFORNIA.

MECHANISM FOR CONTROLLING IMPACT-STREAMS.

1,002,517. Specification of Letters Patent. Patented Sept. 5, 1911.

Application filed August 19, 1908. Serial No. 449,209.

*To all whom it may concern:*

Be it known that I, GEORGE J. HENRY, Jr., a citizen of the United States, residing in the city and county of San Francisco and State of California, have invented certain new and useful Improvements in Mechanism for Controlling Impact-Streams, of which the following is a specification.

The present invention relates to that class of controlling means for impact streams used in connection with the operation of tangential water wheels, wherein is employed means for regulating the outlet area of the discharge orifice of a nozzle, and for deflecting the issuing impact stream to control a quantity of water delivered onto the buckets of the water wheel.

One object of the invention is to provide a system of interworking instrumentalities which shall be thrown into action by the movement of the governor mechanism, in response to a sudden call on the part of the said governor mechanism, either that an increase quantity or a decrease quantity of water be placed onto the buckets of the water wheel.

A further object of the invention is to provide for the utilization of a fixed or non-deflectable nozzle, thereby avoiding the expense incident to the formation of a deflecting joint and in the saving of the means commonly employed to compensate for the strains resulting from the use of such nozzles, and to so arrange the working parts thrown into action by the governor mechanism that the means employed for controlling the outlet orifice of the nozzle, shall have quick movement in one direction in order to enlarge the outlet area for the discharge of an impact stream in response to a call on the part of the governor for an increase of water quantity onto the water wheel, while its action in the opposite direction to reduce the outlet area for the impact stream, will be a slow one, to gradually close the outlet of the nozzle; the means for controlling the quantity of the impact stream delivered onto the buckets of the water wheel being such that the deflector is quickly moved relative to the impact stream in accordance with sudden changes occurring in the loads placed onto the water wheel in order to obtain quick action in response to the shifting of the position of the governing means, but is slowly moved out of the impact stream during the closing action of the regulating means to gradually reduce the outlet area of the nozzle, the movement of the deflector, during such action, being in proportion to the closing movement of the regulating means.

To comprehend the invention, reference should be had to the accompanying sheets of drawings, wherein:—

Figure 1 is a side view of the apparatus with the deflecting means positioned for a deflection of a portion of the impact stream, the connections between the valve cylinders and the fluid cylinders being removed; also the connections between the pressure pump and the said valve cylinders. Fig. 2 is a similar view illustrating the deflecting means moved out of the impact stream, the valve cylinders, the connection between the same and the fluid cylinders, and the means for actuating the pilot valves within the valve cylinders being broken away. Fig. 3 is a broken diagrammatic view disclosing the valve cylinders, the fluid cylinders, the connections between the valve cylinders and the fluid cylinders, the connection between the valve cylinders and the sump for securing the return fluid discharged therefrom, and the pressure pump for supplying fluid under pressure to the valve cylinders, the said cylinders being sectioned, also being sectioned the valved portion of the connection between the same and the fluid cylinder containing the piston for operating the valve within the nozzle. Fig. 4 is an enlarged detail side view of the means for actuating the pilot valves within the valve cylinders, disclosing more fully the connections for operating the pilot valve of the valve cylinder, controlling the movement of the stream deflecting means. Fig. 5 is a similar view with the vertically movable rolls and connecting links for operating the lever controlling the movement of the pilot valve within the valve cylinder for actuating the deflecting means, the cam on the governor controlled rock-shaft for varying the position of said rolls on the shifting of the governing means, the cam-wedge for such rolls, and the connection therewith from the supplemental rock-shaft, being removed in order to more clearly illustrate the means for operating the pilot valve within the valve cylinder controlling the action of the piston within the fluid cylinder for operating the valve within the nozzle. Fig. 6 is a plan view of the mechanism disclosed in Fig. 4 of the drawings. Figs. 7 and 8 are enlarged detail views of parts removed for the purpose of clearness, and Fig. 9 is a view taken on line 9—9 of Fig. 7.

In the drawings, the numeral 1 is used to designate a rigid or non-deflectable nozzle, preferably of curved form, which is attached in the usual manner to a main line or supply pipe. Within the nozzle 1 is arranged for longitudinal movement, a needle valve 2′, which valve regulates the outlet area of the nozzle for the issuing impact stream. The deflection of the impact stream issuing from the nozzle, to control the quantity of water delivered onto the buckets of a tangential water wheel 3, is under the control of a deflector 3′, which is pivoted below the nozzle and arranged to swing in advance of the same by means of the hereinafter described mechanism.

At any suitable point adjacent the hydraulic nozzle, is located a rock-shaft 4 which, preferably, is connected to and actuated by an ordinary automatic governor 4′, in accordance with load changes occurring demanding quick regulation as to the water furnished to the buckets of the tangential water wheel 3. On the rock-shaft 4, is arranged two spaced oppositely curved cams 5—5′: the first mentioned cam acting against the roll 6, held against the said cam by the roll 6′. The said rolls slide in vertical guide-ways 7 in the frame 7′, being held normally upward by the weight 8. This weight is suspended from the axis of the roll 6′ by the cords 8′, which work over pulleys 9 loose on the rock-shaft 4. The roll 6′ carries the depending links 9′, which links are connected to a lever 10; pivoted to the stem 10′ of the pilot valve 11, working within the cylinder 12. The outer end of the said lever 10, is fulcrumed to the rod 12′, connected at its lower end to one member of the bell crank lever 13. The other member of the said crank lever is connected by the rod 13′ to a crank arm 14, secured to the axis of the deflector 3′, which deflector is connected by a link 14² to the stem 14′ of the piston 15, working in the cylinder 15′. The piston 15, within the cylinder 15′, is actuated to raise and lower the deflector 3′, by means of fluid admitted under pressure into the cylinder 15′ from the cylinder 12. the connections between the ports 16—16′ of the cylinder 12, and the ports 17—17′ of the cylinder 15′, being made respectively by means of the pipes 18—18′.

The stem 19 of the needle valve 2′, works within a cylinder 19′, and is connected within the said cylinder to a piston 20, located therein. The said valve stem 19 extends through and is secured to the cross-head 20′, which head is slidable on the guide rods 21. The pressure of the water against the needle valve 2′, during its flow through the nozzle 1, is compensated for by the counter-balance springs 22, on the guide rods 21, which springs act against the cross-head 20′ to balance the water pressure within the nozzle acting against the valve 2′.

To the cross-head 20′, is attached one end of a link 22′, the opposite end of which is secured to one member of the bell crank lever 23. The opposite member of the said bell crank lever 23, has connected thereto the lower end of the rod 23′, which, at its upper end, is pivoted to the crank arm 24. This arm is rigid on the supplemental rock-shaft 24′, and the said shaft is connected by the crank arm 24² to a horizontally disposed cam wedge 25, which wedge works between the rolls 6—6′.

The operation of the foregoing features, which relate to the control of the deflector, as to its movement into and out of the impact stream issuing from the nozzle, will be hereinafter fully explained.

The cam 5′, on the rock-shaft 4, acts against the roll 25′, which is held up to and against the face of the said cam by means of the roll 26. Like rolls 6—6′, the rolls 25′—26 work in the vertical guide-ways 26′ of the frame 27, being held normally upward by means of the weight 27′. This weight is suspended from the axis of the roll 26 by means of the cords 28, working over the pulleys 28′ loose on the rock-shaft 4.

The roll 26 carries the links 29, which links are connected to the stem 29′, of the pilot valve 30, working within the cylinder 30′. The fluid flowing through the cylinder 30′, is admitted into the cylinder 19′, to operate the piston 20 therein, for controlling the movement of the needle valve 2′, in order to regulate the outlet area of the nozzle 1, to vary the quantity of the discharging impact stream in accordance with load changes, and to save the water which would otherwise run to waste where a portion of the issuing impact stream is deflected from off the buckets of the water wheel. The connection between the ports 31—32 of the cylinder 30′, and the ports 32′—33 of the cylinder 19′, being made respectively by means of the pipes 34—34′. In the pipe 34 is located an outwardly movable hinged valve 35, provided with an opening 35′, while in the pipe 34′, is located an inwardly movable hinged valve 36, provided with an opening or port 36′. By this arrangement, the fluid from cylinder 30′ is quickly admitted through the pipe 34 into the cylinder 19′, to actuate the piston 20 therein to gain rapid movement of the needle valve 2′, for increasing the outlet area of the nozzle 1 to place water into the buckets of the water wheel; while the flow or return of fluid from the cylinder 19' to the cylinder 30', through the pipe 34, is a slow one, as the valve 35 is held closed and the escape of fluid is through the opening or port 35'. This return flow of the fluid from cylinder 19' to cylinder 30', takes place on the piston 20 moving outwardly to actuate the needle valve 2' to reduce the outlet area of the nozzle, which movement must be a gradual one in order to prevent water ram in the pipe line. This movement of the piston 20 is occasioned by the flow of fluid from cylinder 30' into the cylinder 19', through the pipe 34'; the fluid escaping through the opening or port 36', in the inwardly movable hinged valve 36, located in the pipe 34'. On the return flow of the fluid through the pipe 34', when the piston 20 is moved in an opposite direction, the valve 36 swings inwardly, admitting of a quick movement of the fluid. Thus, through each of the pipes 34—34', there is a quick movement or flow of the fluid in one direction, and a slow flow in the opposite direction, allowing for a rapid inward movement of the needle valve 2', to increase the outlet area of the nozzle 1, and a slow outward adjustment of said needle valve to gradually reduce the outlet area of the nozzle without causing a water ram in the pipe line.

On the supplemental rock-shaft 24', is rigidly secured an upwardly projecting crank arm 37, which is connected at its upper end to a horizontally disposed wedge cam 37'. This cam works between the vertically movable rolls 25'—26; its purpose being to depress the roll 26 to force downward the piston stem 29'; to move the pilot valve 30 so as to cut off the flow of fluid to the cylinder 19', and hold the needle valve 2', in adjusted position, the cam 37' also being constructed to allow the roller 26 to rise with the valve stem 29' at certain stages of the operation, as will be hereinafter fully explained.

In brief, the needle valve has a two fold action, one being a quick movement for increasing the outlet area of the nozzle in accordance with a sudden call on the part of the governing means for an increase of water onto the buckets of the water wheel for meeting the requirement of an increase load placed onto the wheel; the second action being a slow adjustment of the needle valve to gradually reduce the outlet area of the nozzle in order to diminish the flow of water therefrom to create a saving of water without injury to the pipe due to a water ram. The deflector for the issuing impact stream to place the same in whole or in part off of or onto the buckets of the water wheel, has quick movement into the stream for a rapid deflection thereof when the governor calls for a reduced quantity of water onto the buckets of the water wheel, and it has a quick movement away from the stream in response to a sudden call on the part of the governor for an increase quantity of water onto the buckets of the water wheel; these movements being independent of the action of the needle valve mechanism. However, after the deflector has moved into the impact stream to deflect the same, then its movement out of the stream is in proportion to the outward movement of the needle valve to gradually reduce the outlet area of the nozzle. These features and the operation thereof, will be fully understood from the following description, as to the workings of the various parts.

Assuming the parts to be positioned as set forth in Fig. 1 of the drawings, and an increase of load occurs on the water wheel, demanding that more impact water be furnished to generate power on the water wheel. The governor mechanism will then rotate the rock-shaft 4, in the direction of the arrow $b$, the shifting of which rock-shaft by the governor mechanism carrying with it the cam 5, which cam swinging inwardly permits of the roll 6, and its associated roll 6', being raised by the suspended weight 8, carrying therewith the lever 10, which for the moment pivots about its fulcrum point $a$, lifting the piston stem 10', to move the pilot valve 11, to uncover the outlet 16, of the cylinder 12, permitting the fluid to flow from said cylinder through the pipe 18, into the cylinder 15', through its upper port 17. The piston 15, within the cylinder 15', is quickly moved downwardly, and a portion of the fluid contained in said cylinder forced therefrom through the outlet 17', and returned by means of the pipe 18', to the cylinder 12, through its port 16', and discharged from said cylinder through the discharge pipe $37^2$, into the sump or well $37^3$; the pressure fluid being at all times furnished the cylinder 12, through the pipe connection 38, leading from the pressure pump 38'. It will thus be seen that as the piston 15, moves downwardly within the cylinder 15', the deflector 3', through its connection with the stem 14', of the piston 15, will lower or drop a sufficient amount, until through the action of the bell crank 13, connected to the deflector by the rod 13', the lever 10, is drawn downwardly by the connecting link 12, carrying therewith the stem 10', causing the pilot valve 11, within the cylinder 12, to close the port 16, against the flow of fluid from the cylinder 12, into the cylinder 15', and the port 16', so as to cut off the return flow of fluid from the cylinder 15', to the cylinder 12. Should the rock-shaft 4, be rotated in an opposite direction, the action of the described ports will be the reverse of that set forth, and the stream deflector will be quickly forced into the impact stream to an amount corresponding with the displacement of the said rock-shaft, so as to deflect in whole or in part the impact stream issuing from the nozzle.

It will be understood that as the deflector 3', moves away from the impact stream, the needle valve 2', in the nozzle 1, is withdrawn from within the outlet thereof, so as to proportion the outflow of the impact stream in proportion to the working requirements of the load placed onto the water wheel, and it is required that the adjustment of the needle valve be a quick one in order to place the desired quantity of water onto the buckets of the water wheel at the earliest possible moment and in accordance with the action of the governor calling for such an increase as to water quantity. This is accomplished by reason of the fact that as the secondary cam 5', is carried over as the rock-shaft 4 is forced ahead, the same act against the roll 25', and forces the same and its held roll 26, downwardly, carrying therewith the piston stem 29', to move the pilot valve 30, so as to uncover the port 32, of the pressure cylinder 30', and permit of fluid under pressure escaping therefrom, and from the pipe 34, into the cylinder 19', in advance of the piston 20, working therein, quickly forcing the said piston inwardly, which, carrying therewith the needle valve 2', opens the outlet of the nozzle 1, for the escape of the required amount of water. The oil or fluid within the cylinder 19', is received through the connection 34', into the pressure cylinder 30', from which it escapes by means of the outlet 40 and $37^2$ into the sump or well $37^3$, the pressure fluid to the said cylinder 30', being supplied through the connection 40', from the pressure pump 38'. However, as the needle valve 2', moves inwardly to increase the outlet area of the nozzle 1, in accordance with the deflection of the deflector from within the impact stream, issuing from the nozzle, the cross-head 20, is moved therewith, which forcing inwardly the link 22', throws the bell crank 23, to exert an upward force onto the rod 23'. This upward force onto the rod 23', operates the crank-arm 24, to rotate the supplemental rock-shaft 24', in the direction of the arrow c illustrated in Fig. 1 of the drawing. With this movement of the crank arm 24, the cam wedge 25, is forced inwardly between the rolls 6—6', so as to force downwardly the roll 6', in order to operate the valve 11 and motor 15 to restore the deflecting plate 3' to normal position, while at the same time the crank arm 37 on the rock-shaft 24', moves the cam wedge 37', inwardly between the rolls 25'—26, which permits the upward movement of the piston stem 29', and moves the pilot valve 30, within the pressure cylinder 30', to close the outlet port 31; thus cutting off the flow of fluid under pressure into the cylinder 19', and placing the piston within the said cylinder and the needle valve within the nozzle at a state of rest, with the needle valve 2', properly positioned for allowing of a discharge of an impact stream in proportion to the working requirement called for by the governor mechanism. It will thus be observed that the working of the deflector and the needle valve, where an increase in water quantity is called for, are in unison, and the movement of one is in proportion to the movement of the other.

We will now assume that the governor's action takes place, calling for a quick reduction as to the quantity of water onto the water wheel, occasioned by a reduction of the working load.

The first action is that the governor mechanism imparts a rotation to the rock-shaft 4 in the direction of the arrow d illustrated in Fig. 1 of the drawings, so that through the action of the cam 5, and the connections previously described, the deflector quickly rises into the stream, so as to deflect the necessary water quantity of the impact stream, issuing from the nozzle from off the water wheel, thus maintaining the speed of the wheel constant. If the apparatus did not operate any farther than this, the water so deflected from off the buckets of the water wheel would be running to waste; and therefore, it is necessary to place into action simultaneously with the working of the deflecting mechanism, means for gradually shutting off this wasting water, in order to prevent the waste of such water and to avoid the necessity of setting or adjusting the needle valve within the nozzle by hand. With the described adjustment of the rock-shaft 4, the cam 5', secured thereon, is moved correspondingly away from the surface of the roll 25', which, being connected or held to the roll 26, through the medium of the cam wedge 37, permits weight 27' to establish an upward movement thereof raising the piston stem 29', moving the pilot valve 30, within the valve cylinder 30', to open the port 31, permitting fluid under pressure to flow through the valved connection 34', into the cylinder 19', back of the piston 20, within the said cylinder. The pressure thus admitted into the cylinder 19', forces outwardly the piston 20, and causes the needle valve to travel therewith so as to gradually reduce the outlet orifice of the nozzle 1. However, as the fluid thus admitted into the cylinder 19', is forced to travel through a restricted port in the inwardly swinging valve 36, located in the connection 34', its flow into the said cylinder is materially reduced over the flow of fluid into the said cylinder through the connection 34; while the return of the expelled fluid from the cylinder 19', into the valve cylinder 30', through the connection 34, is materially reduced in speed over the return of the expelled fluid from the cylinder 19', into the valve cylinder 30', through the valved connection 34', due to the fact that when the return fluid is traveling through connection 34, it is acting against the outwardly hinged valve 35, and its escape is through the restricted port in the said valve. Inasmuch as during the closing movement of the needle valve 2', the fluid is thus slowly admitted into the cylinder 19', it follows that the piston 20, is slowly moved outwardly, and consequently the action of the needle valve 2', in closing or reducing the outlet area of the nozzle 1, is a gradual one. This is necessary in order to prevent water ram in the pipe line, which does occur where the velocity of the water, flowing through the discharge nozzle, is suddenly checked. It is obvious that there must be some corresponding synchronous action in the stream deflector 3', such that the same is gradually withdrawn from within the issuing impact stream as the area of the stream is reduced by the needle valve 2', being gradually forced outwardly within the nozzle. This is accomplished by the pull exerted by the outwardly moving cross head 20', onto the link 22', which actuates the bell crank 23, so that, through its connection, the position of the rock-shaft 24', is shifted to move outwardly the wedge cams 25—37', with the result that as the distance between the rolls 6—6' decreases and between the rolls 25'—26 increases, acting to shift the pilot valves 11—30, of the pressure cylinders 12—30', to gradually cut off the flow of pressure fluid into the cylinder 19' and to admit pressure above the piston 15 to withdraw deflector 3' from the stream, the pistons then coming to rest. The deflector is thus gradually withdrawn from within the stream, so that by the time the needle valve has advanced sufficiently far to make the correction called for, the deflector will stand so as to just clear the edge of the impact stream.

It is apparent that the action of the deflector will be dependent upon the curvature of the cam 5, and of the wedge cam 25; while the action of the needle valve will be dependent upon the curvature of the cam 5', and the wedge cam 37', and that these curvatures must be so made that the operation of the needle valve 2', and the deflector 3' will be such that when the apparatus is in equilibrium, the deflector will just clear the edge of the issuing impact stream without interference with the solidity thereof.

By the use of the described invention, if the load is brought to zero, the operation would be such that the needle valve entirely closes the outlet of the nozzle and the stream deflector comes up to the center line of the outlet orifice of the nozzle. In case of full load being thrown onto the apparatus, the deflector is suddenly thrown downwardly so as to just clear the line of the impact stream, and the needle valve is quickly withdrawn to correspond with a full size stream.

The needle valve is permitted quick action in its movement of withdrawal for placing an increased quantity of water onto the water wheel, while the deflector is moved quickly away from the stream with the withdrawal of the needle valve and quickly into the stream for a deflection of the same in whole or in part from off of the buckets of the water wheel; although the movement of the needle valve in reducing the area of the outlet orifice of the nozzle is a slow one to prevent water ram in the pipe line, and on such movement of the needle valve the withdrawal of the deflector from within the impact stream is a gradual one, corresponding to the movement of the said needle valve.

Having thus described the invention what is claimed as new and desired to be secured by Letters Patent is:—

1. The combination with a hydraulic motor, a water supply pipe, a discharge nozzle rigidly connected thereto, of governing mechanism, automatically controlled deflecting means thrown into action on the shifting of the governor to move away from or toward the stream in response to a call of the governing mechanism for an increase or a decrease in the water quantity, automatically controlled means simultaneously placed into action for quickly increasing the outlet of the fixed nozzle on a call of the governing mechanism for an increase of water quantity and slowly closing the outlet of the nozzle on a demand for a decrease in the water quantity, and of devices actuated on the movement of said means for restoring the stream changing means to normal position.

2. In an apparatus of the described character, the combination with the valved cylinders, of the pilot valves working therein, a rock-shaft, a governor connected therewith, devices carried by the rock-shaft for actuating the pilot valves of the valved cylinders on a shifting of the governor fluid actuated motors controlled respectively by said valves for the purposes set forth, and means including a supplemental rock shaft, actuated by said motors for resetting the pilot valves of the valved cylinders.

3. In an apparatus of the described character, the combination with a tangential water wheel, of a fixed or non-deflectable nozzle, means for regulating the outlet area thereof, a deflector working in advance of the nozzle for deflecting a stream issuing therefrom in whole or in part from off the water wheel, a governor, and means thrown into action on the shifting of the governor for automatically placing in operation the means to regulate the outlet area of the nozzle and the deflector for deflecting a portion of the jet issuing therefrom, and devices for bringing the regulating means and the deflector to a state of rest without varying the adjusted position of the governor.

4. The combination with a fixed or non-deflectable nozzle for the discharge of an impact stream onto a water wheel, a valve movable within the nozzle for regulating the outlet area thereof, a deflector arranged to swing in advance of the nozzle into and out of the stream issuing therefrom, means for shifting the deflector quickly on variations in the load on the water wheel, means for quickly moving the valve to increase the outlet area of the nozzle and slowly moving the same to reduce the outlet of said nozzle, and of devices placed into operation on the closing stroke of the valve to correspondingly move the deflector out of the issuing stream.

5. In combination with a water wheel, of a water supply pipe, a discharge nozzle rigidly connected thereto, a governor and means controlled by the shifting of the governor for automatically regulating the quantity of water discharged from the nozzle and deflecting from the nozzle discharge relative to the water wheel.

6. In combination with a water wheel, of a rigid discharge nozzle for an impact stream, and automatically controlled and independently operated means for regulating the quantity of water discharged from the nozzle and deflecting the nozzles discharge relative to the water wheel.

7. In combination with a water wheel, a water supply pipe, a discharge nozzle rigidly connected thereto, means for automatically regulating the discharge from the fixed nozzle, and associated means for automatically deflecting a portion of the discharge from the nozzle away from the water wheel.

8. In combination with a water wheel, of a water supply pipe, a discharge nozzle rigidly connected thereto, automatically controlled deflecting means movable into and out of the stream discharged from the nozzle, and means thrown into action with the deflecting means for automatically regulating the discharge from the fixed nozzle.

9. The combination with a hydraulic motor, a water supply pipe, a discharge nozzle rigidly connected thereto, of governing mechanism, and means thrown into action on the shifting of the governing mechanism to deflect the discharge from the fixed nozzle relative to the motor, and regulate the quantity of water discharged from the nozzle in accordance with the shifting of the said governing mechanism.

10. The combination with a hydraulic motor, of a supply pipe, a discharge nozzle rigidly connected thereto, of governing mechanism, automatically controlled means thrown into action on the shifting of the governing mechanism to deflect the discharge from the fixed nozzle relative to the motor, and regulate the quantity of water discharged from the nozzle in accordance with the shifting of the said governing mechanism.

11. In combination with a water wheel, a fixed or non-deflectable water wheel nozzle, of means for automatically deflecting a portion of the stream ejected therefrom to meet the requirement of the load variations on the wheel, of means whereby the outlet area of the fixed nozzle is automatically varied to regulate the issuing impact stream to compensate for such load changes.

12. In an apparatus of the character described, a stationary water wheel nozzle, a governor, means controlled by the shifting of the governor for automatically regulating the quantity of water discharged from the nozzle and a deflector movable into and out of the path of the issuing stream.

13. In combination with a water wheel, of a water supply pipe and discharge nozzle rigidly connected thereto, a governor, means controlled by the shifting of the governor for automatically regulating the water discharged from the nozzle, and a deflector interposed between the outlet end of the nozzle and the water wheel.

14. In a hydraulic nozzle for a water wheel, mechanism for automatically regulating the amount of water discharged therefrom combined with a deflector movable into and out of the path of the issuing stream.

15. In a hydraulic nozzle for a water wheel, mechanism for automatically regulating the amount of water discharged therefrom combined with automatically operated mechanism movable into and out of the issuing stream for deflecting a portion thereof.

16. The combination with a hydraulic motor, of a water supply pipe, a nozzle for the discharge of an impact stream rigidly connected thereto, a governor mechanism, automatically controlled means thrown into action on the shifting of the governor mechanism for deflecting a portion of the impact stream, automatically operated means simultaneously thrown into action for regulating the outlet of the fixed nozzle in accordance with the shifting of the governing mechanism, and means for bringing the automatically operating means to a state of rest on the impact stream being proportioned to the working load of the motor and holding the same in such position until a change takes place in the governing mechanism.

17. The combination with a fixed or non-deflectable nozzle for the discharge of an impact stream onto a tangential water wheel, of automatically controlled means for regulating the discharge outlet therefrom to proportion the issuing impact stream in accordance with load changes on the water wheel, and for deflecting the issuing jet.

18. The combination with a fixed or non-deflectable nozzle for the discharge of an impact stream onto a tangential water wheel, a deflector adjacent the discharge end of the nozzle, arranged to swing into and out of the path of the impact stream, fluid actuated means for shifting the position of the said deflector, a longitudinally movable valve within the nozzle for regulating the outlet area, of fluid actuated means for imparting rapid movement to the needle valve in one direction for increasing the outlet area of the nozzle, and a slow movement thereto in an opposite direction for gradually reducing the outlet area of the nozzle, a governor, and means actuated on the shifting of the governor for throwing into action the means for causing the movement of the valve within the nozzle and the deflector.

19. The combination with a fixed or non-deflectable nozzle for the discharge of an impact stream onto a tangential water wheel, a deflector adjacent the discharge end of the nozzle, arranged to swing into and out of the path of the impact stream, fluid actuated means for shifting the position of the said deflector, a longitudinally movable valve within the nozzle for regulating the outlet area, of fluid actuated means for imparting rapid movement to the needle valve in one direction for increasing the outlet area of the nozzle, and a slow movement thereto in an opposite direction for gradually reducing the outlet area of the nozzle, a governor, means actuated on the shifting of the governor for throwing into action the means for causing the movement of the valve within the nozzle and the deflector, and devices for bringing the said valve and the deflector to a state of rest on the impact stream being proportioned to the working load placed onto the wheel.

20. In an apparatus for the purpose described, the combination with a fixed or non-deflectable nozzle for the discharge of an impact stream onto a tangential water wheel, a valve within the nozzle for regulating the outlet area thereof, a cylinder containing a working piston for operating the said valve, a deflector arranged to swing in advance of the nozzle to deflect the issuing stream in whole or in part from off the water wheel, a cylinder containing a working piston for moving the deflector into and out of the issuing stream, a plurality of cylinders, each containing a pilot valve, means for supplying fluid under pressure into said cylinders, connections between said cylinders and the first named cylinders for admitting pressure thereto for operating the pistons therein, a governor, connections for operating the pilot valves on the shifting of the governor to admit fluid under pressure to the cylinders, and devices for restoring the pilot valves to bring the valve within the nozzle and the deflector to a state of rest without disturbing the adjusted position of the governor.

21. The combination with a hydraulic motor, a stationary nozzle for directing an issuing stream onto the motor, of governing mechanism, a deflecting hood for varying the direction of the issuing stream, of means thrown into action on the shifting of the governing mechanism to actuate the deflecting hood in one direction on a call for a quantity of water onto the motor and move the same in an opposite direction as regulation of water quantity is secured, a longitudinally movable needle valve within nozzle for regulating the outlet orifice thereof, fluid actuated means for moving the valve into and out of the outlet orifice of the nozzle, and devices primarily thrown into action by the governing means to set into operation said fluid actuated means for moving the valve in one direction and secondly placed into reverse operation by the movement of the needle valve to gradually close the fluid actuated means as the same moves to regulate the outlet orifice of the nozzle.

22. The combination with a hydraulic motor, of a fixed nozzle for placing an issuing stream thereon, a longitudinally movable valve within the nozzle for regulating the outlet orifice thereof for water quantity, a deflecting hood for controlling the direction of the issuing stream, governing means, fluid actuated mechanism operated by the governing means for shifting the deflecting hood on variations in the working load placed onto the motor and moving the same in an opposite direction in accordance with adjustment of the water to load variations, of fluid actuated mechanism placed in operation to move the needle valve into or out of the outlet orifice of the nozzle, and means operable with the shifting of the deflecting hood for placing the said fluid mechanism into operation and stopping the same to bring the needle valve to a state of rest.

23. The combination with a hydraulic motor, a stationary nozzle for directing an issuing stream onto the motor, of governing mechanism, a deflecting hood for varying the direction of the issuing stream, of means thrown into action on the shifting of the governing mechanism to actuate the deflecting hood in one direction on a call for a quantity of water onto the motor and move the same in an opposite direction as regulation of water quantity is secured, a valve for regulating the outlet orifice of the nozzle, devices for moving the valve to open and close the outlet orifice of the nozzle, and means thrown into action by the governing mechanism to set into operation the said devices for controlling the movement of the valve for the nozzle.

In testimony whereof I have signed my name to this specification in the presence of two subscribing witnesses.

GEO. J. HENRY, Jr.

Witnesses:
N. A. ACKER,
D. B. RICHARDS.

Copies of this patent may be obtained for five cents each, by addressing the "Commissioner of Patents, Washington, D. C."